US008690209B2

(12) United States Patent
Badger

(10) Patent No.: US 8,690,209 B2
(45) Date of Patent: Apr. 8, 2014

(54) MANHOLE COVER LIFT DEVICE AND METHOD OF USE

(76) Inventor: Micheal Badger, Ames, IA (US)

( * ) Notice: Subject to any disclaimer, the term of this patent is extended or adjusted under 35 U.S.C. 154(b) by 0 days.

(21) Appl. No.: 13/490,155

(22) Filed: Jun. 6, 2012

(65) Prior Publication Data

US 2013/0328336 A1 Dec. 12, 2013

(51) Int. Cl.
*B65G 7/12* (2006.01)
*B66F 3/00* (2006.01)

(52) U.S. Cl.
USPC ................................ 294/17; 294/16; 254/131

(58) Field of Classification Search
USPC ................ 294/16, 17, 15, 18, 34, 168, 119.1; 254/131, 129, 131.5, 132
See application file for complete search history.

(56) References Cited

U.S. PATENT DOCUMENTS 240,505 A * 4/1881 Cantrell .......................... 294/17
300,968 A * 6/1884 Hatfield ........................ 254/131
1,933,384 A * 10/1933 Moylan ........................... 294/17
2,655,399 A * 10/1953 McMillan ........................ 294/17
3,164,893 A * 1/1965 Ashworth ........................ 29/245
4,181,290 A * 1/1980 Affolter ........................ 254/124
4,191,360 A * 3/1980 Morrison ....................... 254/131
4,250,769 A * 2/1981 Herring ........................... 74/525
4,991,893 A * 2/1991 Gordon et al. .................. 294/17
5,775,674 A * 7/1998 Bigham ........................ 254/131
5,803,518 A * 9/1998 Gibbons .......................... 294/18
6,375,162 B1 * 4/2002 Johnson ........................ 254/131
6,964,407 B1 * 11/2005 Butler ........................... 254/131
7,293,759 B2 * 11/2007 Beach et al. .................. 254/131
8,308,136 B2 * 11/2012 Sanders ........................ 254/130
2005/0280270 A1 12/2005 Howard, Jr.

OTHER PUBLICATIONS

Varco Liquid Waste Hose & Accessories; product search Manhole Lifters; Manhole Lifters by T Lifts online catalog; p. 1; printed Jul. 30, 2012; www.varcopumper.com; copyright Dydacomp 2005; Powered by SiteLINK.

T&T Tools, Inc., Sub-surface hand tools; www.mightyprobe.com online catalog; product search Manhole Hook; pp. 1-2; copyright 2012 Chain Reaction Ecommerce, Inc.; Powered by Loaded Commerce; designed by/contributed by AlgoZone.com.

* cited by examiner

*Primary Examiner* — Paul T Chin
(74) *Attorney, Agent, or Firm* — Zarley Law Firm, P.L.C.

(57) ABSTRACT

A manhole cover lifting device has an elongated member which extends a length between a first end and a second end. A handle is connected to the first end and a scraping hook is connected to the second end. An adjustable member slides along the elongated member between a first stop and a second stop. A carriage hook is adjustably connected to the adjustable member.

10 Claims, 2 Drawing Sheets

MANHOLE COVER LIFT DEVICE AND METHOD OF USE

FIELD OF THE INVENTION

This invention relates to a lifting device. More specifically, and without limitation, this invention relates to a lifting device for lifting manhole covers.

BACKGROUND OF INVENTION

Manhole covers are known in the art. A conventional manhole cover is a removable plate forming the lid over the opening of a manhole to prevent anyone from falling in, and to keep unauthorized persons out of, the sewers below. Manhole covers are usually made out of cast iron. Cast iron is used for its strength, rigidity and durability. However, the use of cast iron causes conventional manhole covers to often weigh in excess of 50 kg.

While the substantial weight of a conventional cast iron manhole cover helps to keep them in place when traffic passes over them, this weight also causes difficulties when authorized personnel try to remove manhole covers for access to the sewers below. To help alleviate the difficulties of removing manhole covers, many manhole covers have at least one pick hole therein which allowed the hook end of a manhole hook to protrude below the surface of the manhole. One drawback to this design was that it allowed for air transfer through the pick hole that allowed odors and gasses to escape the sewers below. To alleviate this problem, more modern manhole covers have a pair of pick hole slots positioned in the periphery of the manhole cover and across from each other. These pick hole slots are covered by a rubber seal which does not allow for open air transfer between the sewer below the manhole cover and the environment. This arrangement prevents methane gas from releasing into the environment. This arrangement further serves as a means to separate storm water (which does not require wastewater treatment facilities) from draining through the open pick holes into the sanitary sewer system (which does require wastewater treatment facilities).

The modern manhole cover arrangement with the pick hole slots and the rubber seal has rendered conventional manhole hooks ineffective. As such, problems still remain.

One problem with the use of conventional manhole cover picks is that the process is very labor intensive and requires a lot of strength and effort to remove the manhole cover due to its weight.

Another problem with the use of conventional manhole cover picks is that the picks easily slide out of the pick holes which often leads to accident and injury.

Another problem with the use of conventional manhole cover picks is that the picks are ineffective in removing modern manhole covers.

Thus, it is a primary object of the present invention to provide an improved manhole cover lift device.

Another object of the present invention is to provide an improved method of removing a manhole cover.

Yet another object of the present invention is to provide a device that improves the ergonomics of removing a manhole cover.

Yet another object of the present invention is to provide a device that reduces the amount of strength and energy required to remove manhole covers.

Yet another object of the present invention is to provide a manhole cover removal device that is self adjusting to various sized manhole covers.

Yet another object of the present invention is to provide an efficient method and means for removing sealed manhole covers with opposing pick hole slots.

These and other objects, features, or advantages of the present invention will become apparent from the specification, drawings and the claims.

SUMMARY OF THE INVENTION

A manhole cover lifting device having an elongated member which extends a length between a first end and a second end. A handle is connected to the first end and a scraping hook is connected to the second end. An adjustable member slides along the elongated member between a first stop and a second stop. A carriage hook is adjustably connected to the adjustable member.

DETAILED DESCRIPTION OF THE INVENTION

Figure 1:
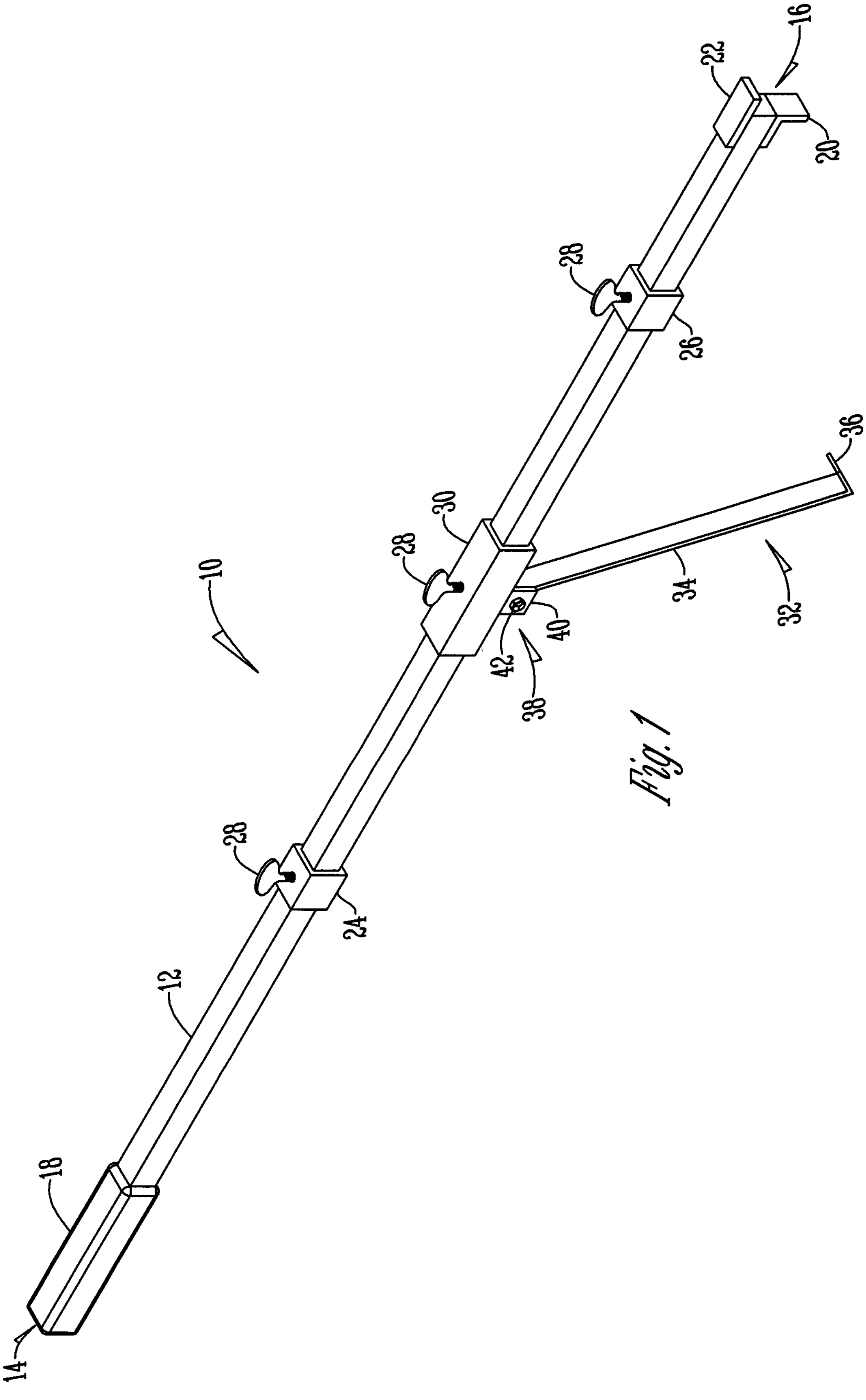
FIG. 1 is a perspective view of a manhole cover lifting device.
Figure 2:
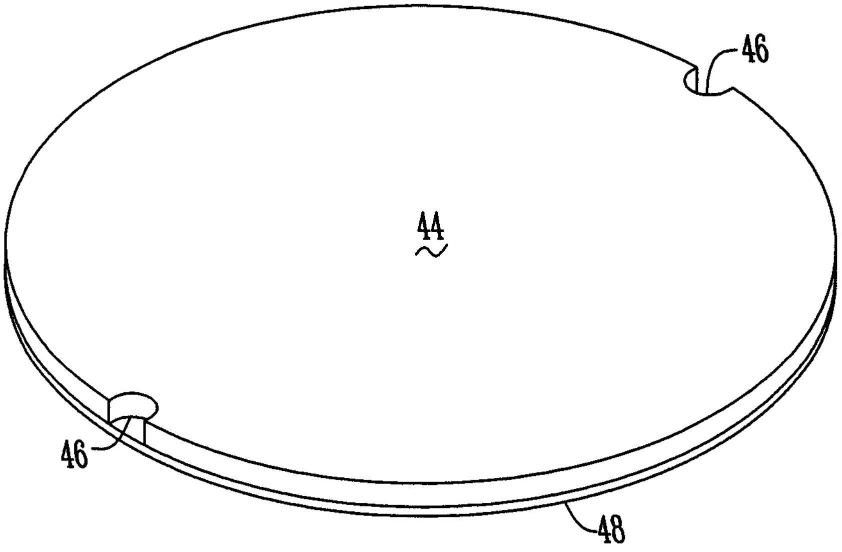
FIG. 2. Is a top plan view of manhole cover.

With reference to the drawings, a manhole cover lift device 10 is presented. The lift device 10 has an elongated member 12 which extends a length between a first end 14, also known as the handle end, and a second end 16, also known as the lift end. Preferably, the elongated member 12 is a length of hollow square tubing which provides substantial rigidity due, in-part, to its shape. Alternatively, elongated member 12 is made of hollow round tubing, an I-beam, a solid round or square rail, or any other shaped extension. Preferably, elongated member 12 is made of high quality aluminum for its strength and light weight properties. Alternatively, elongated member 12 is made of steel, iron, carbon fiber, fiberglass, or any other durable and rigid material.

Connected to the first end 14 is a handle 18. Handle 18 is any device which makes the device 10 easier and more comfortable to use. Preferably, handle 18 is a thin compressible covering over the first end 14 of elongated member 12 such as rubber or foam or the like.

Connected to the second end 16 is at least one scraping hook 20. In one arrangement, scraping hook 20 is permanently attached to second end 16 of elongated member 12. In this arrangement, scraping hook 20 is either formed directly into elongated member 12, machined out of the material of elongated member 12, welded directly to elongated member 12, or the like. Alternatively, scraping hook 20 is removably and replaceably attached to second end 16 by any conventional means such as bolting, screwing, snap-fit or the like. Scraping hook 20 is of any operable size and shape, to allow for the removal of manhole covers. Preferably scraping hook 20 is a flat piece approximately the width of elongated member 12 which, when viewed from the side, is attached to and extends a short length of elongated member 12, bends in an L-shaped fashion at the end 16 of elongated member 12 and then extends outwardly from and perpendicular to the length of elongated member 12 in an L-shape fashion (as is pictured in FIG. 1). Alternatively, scraping hook 20 is shaped in an L-shape and is welded to the second end 16 of elongated member 12 to cover and close the open second end 16 to seal elongated member 12 and improve its strength and durability. In this arrangement one end of scraping hook 20 extends parallel to the length of elongated member 12 and the other end of scraping hook extends perpendicular to the length of elongated member 12. (This arrangement is not shown in FIG. 1, however it is accomplished by rotating reference numeral 20 90 degrees around the second end 16 of elongated member 12 and welding it in place, thereby eliminating the need for reference numeral 22). Alternatively, scraping hook 20 extends in a J-shape or U-shape when viewed from the side. Alternatively, instead of being a flat piece, scraping hook 20 is made from a round, tubular, or any other shaped extension of material, which is bent into the operative shape.

Also connected to the second end 16, on the side opposite scraping hook 20 is a protrusion 22. In one arrangement, protrusion 22 is permanently attached to second end 16 of elongated member 12. In this arrangement, protrusion 22 is either formed directly into elongated member 12, machined out of the material of elongated member 12, welded directly to elongated member 12, or the like. Alternatively, protrusion 22 is removably and replaceably attached to second end 16 by any conventional means such as bolting, screwing, snap-fit or the like. Protrusion 22 is of any operable size and shape, to allow for pivoting of the device 10 during the removal of manhole covers. Preferably protrusion 22 is a flat piece approximately the width of elongated member 12 which, when viewed from the side, extends outwardly from and parallel to the length of elongated member 12. Alternatively, protrusion 22 extends in a J-shape, U-shape or L-shape when viewed from the side. Alternatively, protrusion 22 is another scraping hook 20 of a different size and/or shape then the scraping hook 20 previously described. Alternatively, instead of being a flat piece, protrusion 22 is made from a round, tubular, or any other shaped extension, which is bent into the operative shape.

Connected to the elongated member 12, between the first end 14 and second end 16 is a first stop 24 and a second stop 26. First stop 24 and second stop 26 are any object connected to elongated member that stops an attachment from sliding down the length of elongated member 12. Preferably, first stop 24 and second stop 26 are formed of a collar that slides over the length of elongated member 12. In one arrangement, first stop 24 and second stop 26 are permanently attached to elongated member 12. In this arrangement, first stop 24 and second stop 26 are either formed directly into the material of elongated member 12, machined out of elongated member 12, welded directly to elongated member 12, or the like. Alternatively, first stop 24 and second stop 26 are removably and replaceably attached to elongated member 12 by any conventional means such as bolting, screwing, snap-fit, through the use of a locking screw 28 or a locking pin, or the like.

Positioned between first stop 24 and second stop 26 is an adjustable member 30. Adjustable member 30 is any object connected to elongated member 12 that adjustably slides down the length of elongated member 12 between first stop 24 and second stop 26. Preferably, adjustable member 30 is formed of a collar that slides over the length of elongated member 12. As an example, in the event elongated member 12 is a square or round tube, the interior diameter of adjustable member 30 is slightly larger than the exterior diameter of elongated member 12 which allows adjustable member 30 to slide to any position between first stop 24 and second stop 26. Preferably, a locking screw 28 or a locking pin is connected to adjustable member 30 so as to lock adjustable member 30 in place.

A carriage hook 32 is adjustably connected to adjustable member 30. In one arrangement, carriage hook 32 removably and replaceably attached to the elongated member 12 by any conventional means such as bolting, screwing, snap-fit or the like. Carriage hook 32 is of any operable size and shape, to allow for the removal of manhole covers. Preferably carriage hook 20 is a flat piece approximately the width of elongated member 12. Carriage hook 32 has an extension portion 34 which extends to a hook portion 36. Preferably, hook portion 36 is sized and shaped similarly to scraping hook 20. That is, when viewed from the side, hook portion 36 extends outwardly from and perpendicular to the length of extension portion 34 in an L-shape fashion. Alternatively, hook portion 36 extends in a J-shape or U-shape when viewed from the side. Carriage hook 32 is either formed of a flat piece which is bent into the required shape, or alternatively, it is made from a round, tubular, or any other shaped extension, which is bent into the operative shape.

Carriage hook 32 is connected to adjustable member 30 by way of joint 38. Joint 38 is any joint which connects carriage hook 32 to adjustable member 30 while allowing carriage hook 32 to angularly adjust. In one arrangement, joint 30 has a pair of opposing connection members 40 which extend outwardly from adjustable member 30 and a pin 42 which extends between opposing connection members 40. In this arrangement, the end of carriage hook 32 opposite hook portion 36 has a slot therein through which pin 42 passes thereby removably, replaceably and adjustably connecting carriage hook 32 to adjustable member 30.

In operation, a manhole 44 having a pair of opposing pick hole slots 46 positioned in the periphery of manhole 44 and a seal 48 positioned below the manhole cover 44 is removed with the use of manhole cover lift device 10. The adjustable member 30 is slid along elongated member 12 between first stop 24 and second stop 26 until it is positioned appropriately for the size of the manhole cover 44 that is to be removed. Once in the proper position, adjustable member 30 is locked in place by locking screw or locking pin 28. Once in position, hook portion 36 is positioned within the first pick hole slot 46. Next, the scraping hook 20 is positioned in the second pick hole slot 46 opposite the first. Once fully in position, the user lifts up on elongated member 12 using handle 18. The device 10 pivots on protrusion 22 and/or second end 16 lifting manhole cover 44.

In an alternative arrangement, manhole cover lift device 10 is self-adjusting to various sized manhole covers by allowing adjustable member 30 to freely slide between first and second stops 24, 26. In this arrangement, as the user lifts up on elongated member 12, adjustable member 30 automatically slides along elongated member 12 self-adjusting the distance and angle between carriage hook 32 and scraping hook 20 to the appropriate size for the manhole cover 44 which is being lifted. This self-adjusting feature provides for efficient removal of various manhole covers 44 and is an improvement over the prior art.

From the above discussion it will be appreciated that presented is an improved manhole cover lifting device which offers many advantages over the prior art. Namely the device described provides improved method of removing a manhole cover that is ergonomic in nature. In addition, the device described reduces the stress, danger and strength required to remove manhole covers.

It will be appreciated by those skilled in the art that other various modifications could be made to the device without parting from the spirit and scope of this invention. All such modifications and changes fall within the scope of the claims and are intended to be covered thereby.

What is claimed:

1. A lift device comprising:

an elongated member extending a length between a first end and a second end, a scraping hook connected to the elongated member adjacent the second end;

wherein the scraping hook extends past the second end of the elongated member and includes a generally L-shaped bend;

a protrusion connected to the elongated member adjacent the second end;

wherein the protrusion extends past the second end of the elongated member and is formed of a generally flat member;

a first adjustable stop and a second adjustable stop connected to the elongated member and positioned between the first end and the second end;

wherein the first adjustable stop and the second adjustable stop are formed of a collar that slides over the elongated member;

an adjustable member connected to the elongated member having a carriage hook connected thereto;

wherein the adjustable member is formed of a collar that slides over the elongated member;

wherein the adjustable member is positioned between the first adjustable stop and the second adjustable stop;

wherein the elongated member is formed of squared tube so as to prevent rotation of the adjustable member on the elongated member;

wherein the first adjustable stop and the second adjustable stop on the elongated member stop the adjustable member from sliding down the length of elongated member;

wherein the carriage hook has an extension portion and a hook portion, wherein the extension portion is pivotally connected to the adjustable member at a joint by an axel such that the angle of the carriage hook is adjustable.

2. The lift device of claim 1 wherein the protrusion is positioned opposite the scraping hook.

3. The lift device of claim 1 further comprising a handle connected to the first end.

4. The lift device of claim 1 wherein the carriage hook is angularly adjustable.

5. The lift device of claim 1 wherein the adjustable member has a locking pin which locks the adjustable member in place.

6. The lift device of claim 1 further comprising wherein the extension portion of the carriage hook is a single flat member which connects directly to the adjustable member and the hook portion.

7. The lift device of claim 6 wherein when the carriage hook is formed of a single flat member it resists rotation of the carriage hook when lifting manhole covers thereby providing the user with improved control when lifting.

8. The lift device of claim 6 wherein the adjustable member freely slides between the first stop and the second stop when lifting thereby self-adjusting to various sized manhole covers thereby providing for more efficient removal of various sized manhole covers.

9. A lift device, comprising:

an elongated member having a first end and a second end;

a scraping hook connected to the second end of the elongated member;

wherein the scraping hook extends past the second end of the elongated member and includes a generally L-shaped bend;

a protrusion connected to the elongated member adjacent the second end;

wherein the protrusion extends past the second end of the elongated member and is formed of a generally flat member;

a first adjustable stop and a second adjustable stop connected to the elongated member between the first end and the second end;

wherein the first adjustable stop and the second adjustable stop are formed of a collar that slides over the elongated member;

wherein the first adjustable stop, the second adjustable stop and the first adjustable member include a locking member which locks its position on the elongated member;

a first adjustable member positioned between the first adjustable stop and the second adjustable stop;

a carriage hook pivotally attached to the adjustable member;

wherein the first adjustable member is formed of a collar that slides over the elongated member;

wherein the first adjustable stop and the second adjustable stop on the elongated member stop the adjustable member from sliding down the length of elongated member;

wherein the elongated member is formed of a non-round tube so as to prevent rotation of the adjustable member on the elongated member.

10. A lift device comprising:

an elongated member extending a length between a first end and a second end, a scraping hook connected to the elongated member adjacent the second end;

wherein the scraping hook extends past the second end of the elongated member and includes a generally L-shaped bend;

a protrusion connected to the elongated member adjacent the second end;

wherein the protrusion extends past the second end of the elongated member and is formed of a generally flat member;

a first adjustable stop and a second adjustable stop connected to the elongated member and positioned between the first end and the second end;

wherein the first adjustable stop and the second adjustable stop are formed of a collar that slides over the elongated member;

an adjustable member connected to the elongated member having a carriage hook connected thereto;

wherein the adjustable member is formed of a collar that slides over the elongated member wherein the adjustable member is positioned between the first adjustable stop and the second adjustable stop;

wherein the elongated member is formed of a non-round tube so as to prevent rotation of the adjustable member on the elongated member;

wherein the first adjustable stop and the second adjustable stop on the elongated member stop the adjustable member from sliding down the length of elongated member;

wherein the carriage hook has an extension portion and a hook portion, wherein the extension portion is pivotally connected to the adjustable member at a joint by an axel such that the angle of the carriage hook is adjustable.

* * * * *